July 24, 1962 A. A. MILLER 3,046,207
IRRADIATION OF ORGANOPOLYSILOXANES
Filed April 18, 1960
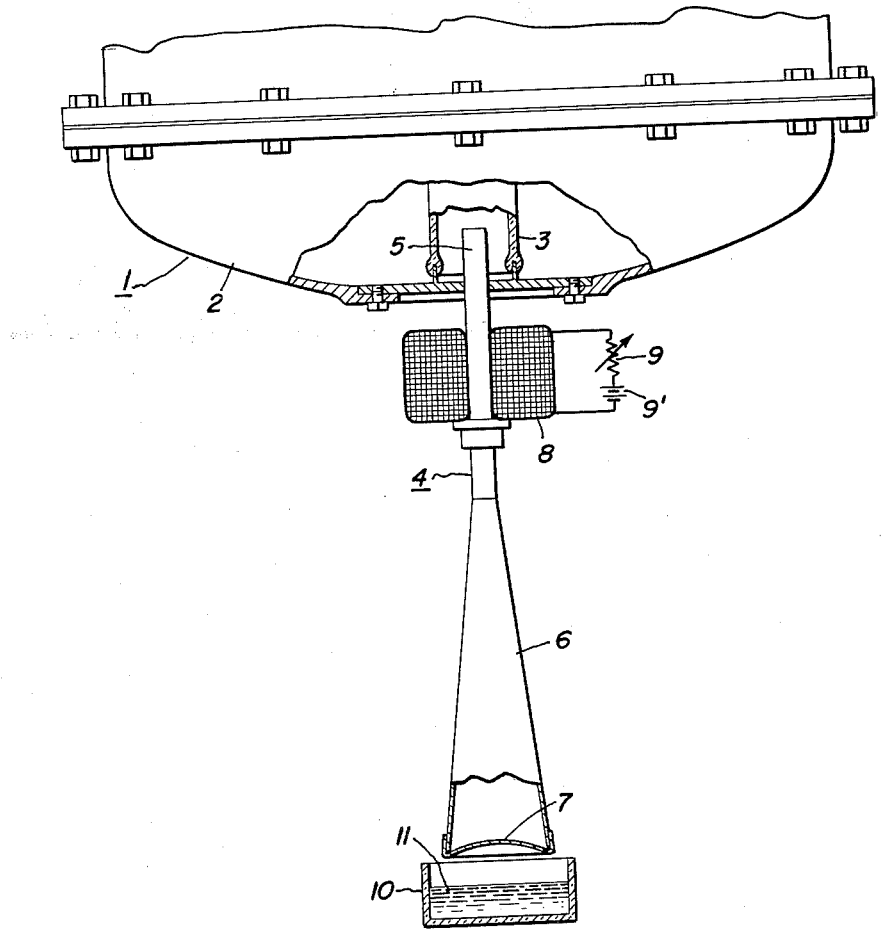
*Inventor:*
*Alexander A. Miller,*
by Joseph T. Cohen
*His Attorney.*

United States Patent Office

3,046,207
Patented July 24, 1962

3,046,207
IRRADIATION OF ORGANOPOLYSILOXANES
Alexander A. Miller, Schenectady, N.Y., assignor to General Electric Company, a corporation of New York
Filed Apr. 18, 1960, Ser. No. 22,987
11 Claims. (Cl. 204—154)

This invention is concerned with a method for forming organopolysiloxanes containing silicon-bonded hydrogen. More particularly, the invention relates to a method for introducing silicon-bonded hydrogen into an organopolysiloxane polymer containing silicon-bonded alkyl groups of from 1 to 2 carbon atoms, which process comprises irradiating an organopolysiloxane having a ratio of from 1.98 to 3 organic groups per silicon atom, at least 50 mole per cent of the organic groups being alkyl radicals having from 1 to 2 carbon atoms, the said irradiation being carried out in the presence of a minor proportion of a hydrogen transfer agent containing a mercapto (—SH) group.

Organopolysiloxanes containing silicon-bonded hydrogens have been found capable of rendering various bodies, for example, textiles, water repellent by treatment of the latter with the aforesaid organopolysiloxanes. Thus, according to Norton Patent 2,386,259 various objects can be rendered water repellent by treating them with the product of hydrolysis of a methyldihalogenosilane of the formula $CH_3SiHX_2$ where X is a halogen, for instance, chlorine, bromine, etc. Dennett Patent 2,588,366 discloses the treatment of various textiles to render the latter water repellent with a mixture of organopolysiloxanes, part of said mixture being a methyl hydrogen polysiloxane, and the remainder of the mixture being a methylpolysiloxane resin free of silicon-bonded hydrogen. In preparing these organopolysiloxanes containing silicon-bonded hydrogen, it is essential that one of the ingredients used to make such compositions contain the silicon-bonded hydrogen, for instance, methyldichlorosilane ($CH_3SiHCl_2$). Such a material is difficult to obtain in satisfactory yields employing any of the presently known methods for making organohalogenosilanes. Because of this the demand for water repellents containing hydrolysis products of methyldichlorosilane far exceeds the supply of this particular material.

As a further obstacle in making these methyl hydrogen polysiloxanes, it is essential that the methyl hydrogen polysiloxane be derived initially from a monomeric methyl hydrogendichlorosilane or similar organo hydrolyzable silanes containing silicon-bonded hydrogen. This leads to some limitations in the methods for making organopolysiloxane containing silicon-bonded hydrogen. It would be advantageous to be able to start with an organopolysiloxane free of silicon-bonded hydrogen, such materials being more readily available and capable of being produced at much less expense than the usual methylpolysiloxanes containing silicon-bonded hydrogen by treating an organopolysiloxane in the preformed state in such a way as to introduce silicon-bonded hydrogen (or —SiH groups).

A still further reason for obtaining organopolysiloxanes containing silicon-bonded hydrogen is that these materials are useful for and are capable of reacting with other reactive monomers to form what are often called graft copolymers. Such graft copolymers can be prepared by reacting an organopolysiloxane containing an SiH group with, for example, acrylonitrile, ethylene, vinyl chloride, etc., to give, for instance, cyanoethyl-substituted, ethyl-substituted, and chloroethyl-substituted polysiloxanes. In contrast to random copolymers, graft copolymers display to a certain extent the characteristics of their constituent homopolymers. Accordingly, graft copolymerization is the method by which limitations of a polymer can be overcome without detracting from its desirable properties.

A still further reason for the desirability of obtaining organopolysiloxanes containing a silicon-bonded hydrogen from organopolysiloxanes free of such silicon-bonded hydrogen, is the fact that when producing the organopolysiloxane containing silicon-bonded hydrogen from monomeric silanes, care must be exercised in effecting conversion of the monomeric materials to the sufficiently high molecular weight state, that one does not use equilibrating or rearrangement catalysts which will attack undesirably the silicon-bonded hydrogen. Thus, it is imperative that in making these organopolysiloxanes containing silicon-bonded hydrogen that one employ as catalysts, for rearrangement or equilibration, which are not alkaline and which will not attack the SiH grouping. Where a base catalyst is employed, it will be found that the SiH groups are converted to SiOH groups which then readily condense with each other causing undesirable and premature gelation.

Accordingly, it is an object of the present invention to provide a method of treating a preformed organopolysiloxane free of silicon-bonded hydrogen so as to introduce silicon-bonded hydrogen groups into the polymer chain.

Another object of the invention is to provide a method whereby some of the lower alkyl groups of the alkylpolysiloxanes attached to silicon by carbon-silicon linkages can be replaced by hydrogen to form silicon-bonded hydrogen groups.

Other objects of the invention will become apparent from the description which follows.

The aforesaid objectives can be obtained and organopolysiloxanes free of silicon-bonded hydrogen can be treated to form organopolysiloxanes containing silicon-bonded hydrogen in accordance with my invention by irradiating an organopolysiloxane free of silicon-bonded hydrogen containing at least 50 mole percent of lower alkyl groups on the polymer chain with ionizing radiation, e.g., high energy electrons, said irradiation being carried out in the presence of a hydrogen transfer agent containing a mercapto group.

The use of the mercapto compound has been found to have two important functions. In the first place the presence of the mercapto compound retards and, in some instances, completely inhibits cross-linking or gelation of the organopolysiloxane. Thus, in U.S. Patent 2,776,-220—Lewis et al., assigned to the same assignee as the present invention, there is disclosed and claimed in this patent a method for preparing insoluble and infusible organopolysiloxanes by irradiating an organopolysiloxane convertible to the cured, solid elastic state with high energy ionizing radiation. I have found that the incorporation of even small amounts of a mercapto compound containing an —SH grouping (hereinafter referred to as "mercapto compound") materially retards and in some instances completely inhibits the conversion of the organopolysiloxane, which is fusible and soluble in many instances and in many instances liquid and soluble, to the insoluble, infusible state. In addition, by effecting irradiation of the organopolysiloxane free of silicon-bonded hydrogen (hereinafter referred to as "organopolysiloxane"), in the presence of the mercapto compound, and if the organopolysiloxane contains a silicon-bonded alkyl group (attached to silicon by a carbon-silicon linkage) of from 1 to 2 carbon atoms, the presence of the mercapto compound serves to effect replacement of some of the lower alkyl groups with hydrogen to give an organopolysiloxane containing silicon-bonded hydrogen groups (hereinafter referred to as "hydrogen polysiloxane").

By means of my invention there is provided a means for the direct production of organo hydrogen polysiloxanes in situ from preformed organopolysiloxanes free of hydrogen attached to silicon. In addition to such formation of hydrogen polysiloxanes, it is apparent that the introduction of silicon-bonded hydrogen groups is effective after the linear high polymeric organopolysiloxane has been formed by the usual hydrolysis and condensation techniques from compounds or monomers which are free of any silicon-bonded hydrogen. My process also enables one to exercise greater control over the degree of molecular weight attainment of the organopolysiloxanes containing silicon-bonded hydrogen than has heretofore been possible because of the way organo hydrogen polysiloxanes have been prepared in the past.

Among the organopolysiloxanes which may be irradiated by the method of the present invention for the purpose of introducing silicon-bonded hydrogens in place of siliocn-bonded lower alkyl groups are those having the formula (I) $$R_mSiO_{\frac{4-m}{2}}$$

where R represents a member selected from the class consisting of alkyl radicals (e.g., methyl, ethyl, propyl, isopropyl, butyl, octyl, etc., radiacls); cycloalkyl radicals (e.g., cyclohexyl, cycloheptyl, etc., radicals); aryl radicals (e.g., phenyl, diphenyl, naphthyl, etc., radicals); alkaryl radicals (e.g., tolyl, xylyl, ethylphenyl, etc., radicals); aralkyl radicals (e.g., benzyl, phenylethyl, etc., radicals); haloaryl radicals (e.g., monochlorophenyl, dibromophenyl, tetrachlorophenyl, monofluorophenyl, etc., radicals); cyanoalkyl radicals (e.g., cyanomethyl, β-cyanomethyl, γ-cyanopropyl, etc., radicals), etc., where at least 50 mole percent of the R groups are lower alkyl groups having from 1 to 2 carbon atoms, preferably the methyl radical, and $m$ has a value from 1.98 to 3. Examples of such organopolysiloxanes are given in Patnode Patents 2,469,888 and 2,469,890, and in Pfeifer Patent 2,704,748, all assigned to the assignee of the present invention wherein are disclosed linear as well as branch-chained organopolysiloxanes coming within the above formula, as well as cyclic organopolysiloxanes, e.g., hexamethylcyclotrisiloxane, octamethylcyclotetrasiloxane, tetraphenyltetramethylcyclotetrasiloxane, octaethylcyclotetrasiloxane, etc.

In general, any mercapto compound containing an —SH grouping which is effective as a chain transfer agent may be used in accordance with the present invention. Among the mercapto compounds which may be used are those having the formula (II) 

wheren $n$ is a whole number from 0 to 6, X is a member selected from the class consisting of hydrogen and carboxylate radicals (e.g., —COOH, —COOR, etc. where R has the meaning given above), and $R_1$ and $R_2$ are radicals selected from the class of radicals as R above and in addition are radicals of the above Formula II wherein at least one carbon atom is connected through $R_2$ so that $R_1$ and $R_2$ together form an aromatic ring.

One particular group of mercapto compounds which can advantageously be used are those corresponding to the general formula (III) RSH where R has the meanings given above with regard to Formula I.

A still further class of compounds which may be employed as the mercapto compounds are those having the formula (IV) 

or (V) 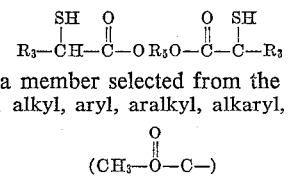

where $R_3$ is a member selected from the class consisting of hydrogen, alkyl, aryl, aralkyl, alkaryl, carboxymethyl

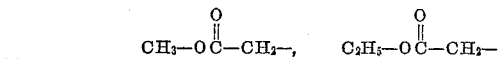

or carbalkoxymethyl, $R_4$ is a member selected from the class consisting of hydrogen, alkyl, aryl, alkoxyaryl, and alkoxyalkoxyalkyl, and $R_5$ is a member selected from the class consisting of divalent alkylene, polyalkylene, alkylene oxide and polyalkylene oxide radicals. Examples of the alkyl and aryl radicals are recited above, while examples of carbalkoxymethyl are, for instance, radicals having the formula

etc. Included among the alkoxyaryl or alkoxyalkoxyalkyl radicals which $R_4$ represents are, for instance, methoxyphenyl, ethoxyphenyl, butoxynaphthyl, ethoxyethoxyethyl, methoxyethoxyethyl, methoxymethoxymethyl, etc. Among the alkylene radicals which $R_5$ may represent are, for instance, ethylene (—$CH_2CH_2$—), methylene, butylene, isobutylene, propylene, isopropylene, etc. radicals. Among the alkylene oxide and polyalkylene oxide radicals which $R_5$ may represent are, for instance radicals such as

etc. More specific compounds coming within the scope of Formulas IV and V may be found in Belgian Patent 582,163.

Specific examples of mercapto compositions which can be employed in the practice of the present invention are, for instance, ethylmercaptan, n-butylmercaptan, n-amylmercaptan, n-octylmercaptan, n-dodecylmercaptan, t-butylmercaptan, t-octylmercaptan, naphthylmercaptan, phenylmercaptan, benzylmercaptan, β-ethoxypropylmercaptan, ethylthioglycolate, thiophenol, 2-mercaptobenzothiazole, mercaptoacetic acid, thioglycolic acid, glycoldimercapto acetate, compounds having the formula

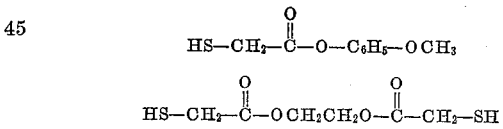

Other examples of hydrogen transfer mercapto compounds may be found in the book "Free Radicals in Solution" by C. Walling, published in 1957 by John Wiley and Sons, page 319. From the foregoing classes of mercapto compounds it is apparent that the mercapto compounds recited above contain a terminal —SH group and any hydrocarbon group in the mercapto compound is free of olefinic unsaturation.

The amount of the mercapto compound used in the practice of the present invention can also be varied within wide limits. Satisfactory results can be obtained in irradiating organopolysiloxane-mercapto compound mixtures containing from as low as about 2 percent to as high as 30 percent or more, by weight, of the mercapto compound based on the weight of the hydrogen-free organopolysiloxane. Preferably, the amount of the mercapto compound advantageously employed is the minimum required to obtain the desired number of SiH groups and which simultaneously maintains the viscosity and molecular weight of the organopolysiloxane undergoing irradiation at a fairly constant level so that the polymeric structure is essentially the same as the starting organopolysiloxane with the exception that the silicon-bonded alkyl groups are replaced with silicon-bonded hydrogens. The mercapto compounds used should be soluble in the silicone in the amount employed so as to form homogeneous solutions therewith. In some instances, adequate solubility may be obtained by employing a small amount of a common solvent for the organopolysiloxane and the mercapto compound so as to obtain a homogeneous solution of the reactants.

The irradiation of the organopolysiloxane in accordance with the present invention may be accomplished by any type of high energy ionizing source, such as, for example, a high voltage accelerating apparatus capable of producing a beam of high energy electrons, an atomic pile, or by the use of gamma radiation. For a better understanding of the irradiation of the organopolysiloxanes in accordance with the present invention, reference is made to the attached drawing in which the single FIGURE shows a high voltage apparatus capable of producing a beam of high energy electrons.

High voltage apparatus 1 may be of the type disclosed in U.S. Patent 2,144,518 issued to Willem F. Westendorp on January 17, 1939, and assigned to the assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage apparatus 1 may be found in the aforementioned Westendorp patent and in "Electronics," volume 17, pages 128–133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross-section to permit an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic field generating winding 8 energized by a source of direct current 9' through a variable resistor 9.

In the irradiation of an organopolysiloxane in the presence of the mercapto compound with the high voltage apparatus 1, a receptacle 10 containing the mixture of the organopolysiloxane and hydrogen transfer agent 11 may be supported in the path of the electrons emerging from the end-window 7 as illustrated. The high energy electrons penetrate the mixture 11 and cause the introduction of Si—H groups into various portions of the organopolysiloxane molecule.

The dose of irradiation applied to the organopolysiloxane-mercapto compound mixture, the rate of irradiation, and the time of irradiation may vary within wide limits. The introduction of the Si—H groups into the organopolysiloxane is essentially independent of the dose accumulation rate of electron irradiation but is dependent upon the total dose. By dose accumulation rate is meant the number of roentgen units of electron irradiation per unit time applied to the organopolysiloxane. Total dose refers to the total number of roentgen units applied in the irradiating operation. A roentgen unit (R) as usually defined, is the amount of radiation that produces one electrostatic unit of charge per cubic centimeter of air under standard temperature and pressure conditions, and as employed here, refers to the amount of electron radiation measured with an air-equivalent ionization chamber at the position of the surface of the organopolysiloxane. Alternatively, in place of roentgen units one can employ the term "Roentgen Equivalent Physical" or more briefly "rep."

The total radiation dose may be varied depending upon the amount and the type of hydrogen transfer agent that is used. In general, I have found that the optimum maximum upper irradiation dose is $1 \times 10^8$ rep. and is advantageously within the range of from $1 \times 10^6$ rep. to $8 \times 10^7$ rep. Below $1 \times 10^6$ rep. the irradiation dosage is usually insufficient to induce the introduction of significant amounts of the Si—H groups into the organopolysiloxane molecule. Usually the mercapto compound has been consumed to form Si—H groups with doses of $1 \times 10^8$ rep. and higher, and at the higher dose range, dangers of the organopolysiloxane gelling are greater. Once the desired dosage has been selected, the rate of irradiation may be varied within wide limits, for example, advantageously from about $1 \times 10^4$ to $1 \times 10^6$ rep. per second to provide the desired dose in the desired period of time. I preferably adjust the rate of irradiation so that the desired dosage will be obtained in a matter of minutes. Since the high energy electrons will tend to form ozone between end-window 7 and receptacle 10 when this space is filled with air, it is desirable to maintain the apparatus in vacuum or under a nitrogen atmosphere when irradiating for periods greater than about one minute. The temperature at which irradiation is carried out has no appreciable effect upon the rate or degree of reaction, and may vary from room temperature (about 25° C.) to 100° C. or higher. For convenience, I prefer to irradiate the organopolysiloxane-hydrogen transfer agent mixture at room temperature. After the irradiation is completed, the organopolysiloxane containing Si—H groups may be isolated from the hydrogen transfer agent by fractional distillation or by suitable solvent treatment and precipitation.

In order that those skilled in the art may better understand how the present invention may be practiced, the following examples are given by way of illustration and not by way of limitation. All parts and percentages are by weight unless otherwise noted.

The apparatus employed was that described in FIG. 1 with 800 kvp. electrons (kvp. refers to the peak voltage in kilovolts generated by the inductance coil with high voltage apparatus 1 during the conducting half cycle and thus is a measure of the energy of electrons emerging from the window 7).

The irradiation dose was governed by the magnitude of the beam current, the position of the sample in the beam, and the length of time the sample was exposed to the beam. The actual determination of the rate of accumulation of dose in rep. per second at the sample position in question was determined by means of an air equivalent ionization chamber. For example, in carrying out the tests described below, it was possible to realize a total dose of $14 \times 10^6$ rep. in one minute at a distance of ten centimeters from the window of the accelerating tube with a beam current of 200 microamperes.

The organopolysiloxane free of silicon-bonded hydrogen employed in the following examples comprised a polydimethylsiloxane (hereinafter so referred to) having the formula

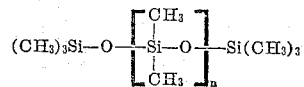

where $n$ is an integer greater than 1. This polydimethylsiloxane had a viscosity of 30,000 centistokes at 25° C. and had an average molecular weight of 85,000. Examples of such polydimethylsiloxanes may be found disclosed in the aforesaid Patnode Patents 2,469,888 and 2,469,890.

EXAMPLE 1

Ten weight percent of dodecyl mercaptan (based on the weight of the polydimethylsiloxane) was dissolved in the polydimethylsiloxane fluid. A 2 gram sample of this mixture was placed in receptacle 10 and a stream of nitrogen was passed over the surface of the liquid. The solution was irradiated with high energy electrons from high voltage apparatus 1 to a dose of $2 \times 10^7$ rep. The resulting organopolysiloxane was reprecipitated (to free it from the mercaptan) from a benzene solution with methanol and vacuum dried at room temperature. Differential infrared spectroscopy using a high resolution Beckman I.R.-7 spectrometer employing a 12 weight percent solution of the irradiated polymer in $CCl_4$ balanced against a similar solution of unirradiated polymer at the same concentration, showed an increase in absorbance at $4.63\mu$ (the absorption band characteristic of the Si—H group) of 0.101 in a 1 millimeter cell. This increase corresponds to a concentration of $6.2 \times 10^{-5}$ moles of Si—H formed per gram of polydimethylsiloxane. Except for the absorption at $4.63\mu$, the infrared spectrum of this sample appeared to be identical with that of the unirradiated polydimethylsiloxane.

EXAMPLE 2

By the method of Example 1, a 6 gram sample of the polydimethylsiloxane containing 10 weight percent thereof of 4-t-butyl thiophenol was irradiated to a dose of $20 \times 10^6$ rep. The irradiated product was dissolved in 50 ml. benzene and the polymer reprecipitated (to free it from the thiophenol) by pouring the benzene solution into 150 ml. acetone, and thereafter drying the polymer. As in Example 1, infrared spectroscopy was used to determine the presence of Si—H produced, which in the present case was found to be $3.2 \times 10^{-5}$ moles per gram polymer.

EXAMPLE 3

A 6 gram sample of the above polydimethylsiloxane without any mercapto compound was irradiated with a dose of $20 \times 10^6$ rep. The resulting product was found to be a solid, infusible material insoluble in benzene, indicating clearly the ability of the mercapto compound to prevent gelation or infusibility and insolubility when subjected to irradiation.

EXAMPLE 4

By the method of Example 1, a 6 gram sample of the polydimethylsiloxane containing 10 weight percent of 4-t-butyl thiophenol was irradiated to a dose of $20 \times 10^6$ rep. The irradiated product was dissolved in 50 ml. benzene and the polymer reprecipitated by pouring the benzene solution into 150 ml. acetone, isolated and thereafter vacuum dried to remove residual benzene and acetone. This material was designated as Sample A. As a control (Sample B) a second 6 gram sample of the polydimethylsiloxane used in Example 1 containing 10 weight percent of the 4-t-butyl thiophenol was dissolved, reprecipitated and vacuum dried as above without being irradiated. As a further control, the original polydimethylsiloxane without any further treatment was identified as Sample C. Curing tests were made on thin films of the above polydimethylsiloxane fluids spread on glass slides. The curing was measured by the loss in fluidity and insolubility of the sample in benzene. A second series of tests were made on these samples containing intimately incorporated therein about 2.5 percent, by weight, dibutyl tin dilaurate, based on the weight of the polydimethylsiloxane. The results of these tests are shown in the tables below.

*Table I*

SAMPLES FREE OF CATALYST

| Time of Heating | A | B | C |
| --- | --- | --- | --- |
| 100° C./30 min | no cure | no cure | no cure. |
| 25° C./24 hrs | no cure | no cure | no cure. |

*Table II*

SAMPLES CONTAINING DIBUTYL TIN DILAURATE

| Time of Heating | A | B | C |
| --- | --- | --- | --- |
| 100° C./30 min | cured | no cure | no cure. |
| 25° C./24 hrs | cured | no cure | no cure. |

Curing of the samples was evidenced by the fact that they were no longer fluid and formed swollen, insoluble gels when immersed in benzene. The "no cure" samples, on the other hand, remained fluid and dissolved completely in benzene.

These results show that control samples B and C, which do not contain Si—H groups, are not cured under the test conditions while Sample A (comprising a polydimethylsiloxane having Si—H groups) readily cured in the presence of a catalyst.

EXAMPLE 5

In this example, the procedure of Example 1 was followed with the exception that an equal amount of n-butyl mercaptan was substituted for 4-t-butyl thiophenol. The irradiation dose in this case was $10 \times 10^6$ rep. The resulting irradiated, isolated polydimethylsiloxane was found to contain $4.35 \times 10^{-5}$ moles Si—H per gram of polymer.

EXAMPLE 6

A 10 weight percent solution of dodecyl mercaptan in the polydimethylsiloxane was irradiated to a dose of $10 \times 10^6$ rep. by the method of Example 1. A 10 percent solution of the irradiated isolated polymer in $CCl_4$ examined with a Beckman spectroscope indicated the presence of $4.3 \times 10^{-5}$ moles Si—H per gram of polymer.

EXAMPLE 7

By the method of Example 1, a 10 weight percent solution of n-butyl mercaptan in the polydimethylsiloxane used in that example was irradiated to a dose of $20 \times 10^6$ rep. Infrared analysis on the isolated polymer revealed the presence of $7 \times 10^{-5}$ moles of Si—H per gram of polymer.

EXAMPLE 8

A 10 weight percent solution of 4-t-butyl thiophenol in the polydimethylsiloxane was irradiated to a dose of $3 \times 10^7$ rep. The infrared spectrum of a 12 percent solution of the isolated irradiated polymer in $CCl_4$ indicated the amount of Si—H produced to be about $9.7 \times 10^{-5}$ moles per gram of polymer.

EXAMPLE 9

When ethyl thioglycolate is substituted for n-butyl mercaptan as in Example 7, a polydimethylsiloxane is obtained having silicon-bonded hydrogen.

By suitably proportioning the starting materials and the radiation dosage, the degree of cross-linking can be controlled to give a gel-free polymer having the desired number of Si—H bonds per molecule. When the molecular weight of the organopolysiloxane is high, one can advantageously use amounts of mercaptan as high as 25–30 percent, by weight, based on the weight of the organopolysiloxane. As the amount of mercaptan added increases, the dose of irradiation may correspondingly increase to give higher final yields of Si—H groups while at the same time suppressing the tendency of the organopolysiloxane to gel.

It will, of course, be apparent to those skilled in the art that in addition to the polydimethylsiloxane employed in the foregoing examples, other organopolysiloxanes, many examples of which have been given previously, may be used without departing from the scope of the invention. The important thing to keep in mind is that when employing other organopolysiloxanes, the number of alkyl groups containing from 1 to 2 carbon atoms attached to silicon by carbon-silicon linkages in the organopolysiloxane, should be in an amount equal to at least 50 mole percent of the total number of organic groups attached to silicon. Obviously, the degree of substitution of organic groups to silicon atoms may also be varied and thus one can also employ within the scope of Formula I, cyclic organopolysiloxanes having a ratio of two organic groups per silicon atom, for instance, octamethylcyclotetrasiloxane, decamethylcyclotetrasiloxane, octaethylcyclotetrasiloxane, tetramethyltetraphenylcyclotetrasiloxane, tetramethyltetracyanoethylcyclotetrasiloxane, etc. Low molecular weight organopolysiloxanes containing ratios of organic groups to silicon atoms in excess of two, may also be used, for instance, hexamethyldisiloxane, octamethyltrisiloxane, etc., many examples of which are given in the aforementioned Patnode Patents 2,469,888 and 2,469,890. In cases where the ratio of organic groups is, for instance, from 1.98 to below 2 organic groups per silicon atom, this is usually accomplished by employing organopolysiloxanes which in addition to monofunctional (for instance triorganosiloxy units such as trimethylsiloxy units), and diorganosiloxy units (for instance, dimethylsiloxy units), one may also have incorporated in the organopolysiloxane molecule trifunctional organosiloxy units, for instance, those having the formula

where R has the meaning given above; examples of such a trifunctional siloxy unit can be methylsiloxy units of the formula

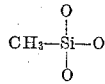

Intercondensed in the organopolysiloxy there may even be very small amounts of tetrafunctional siloxy units derived, for instance, from silicon tetrachloride used in the cohydrolysis, for instance, of such monomers as dimethyldichlorosilane, trimethylchlorosilane and silicon tetrachloride. It should be noted that the trifunctional and tetrafunctional units which may be interconverted to give organopolysiloxanes of ratios of 1.98 to less than 2 are in extremely small amounts in order to keep the ratio of organic groups to silicon atoms within the range of 1.98 to 3.

The types of mercapto compounds which may be used may be varied widely and the amounts thereof also varied within wide ranges. Many examples of such mercapto compounds have been listed previously and the important thing to remember is that the mercapto compound is one which has a free —SH grouping.

It will be readily realized that other forms of electron accelerating apparatus may be employed instead of the high voltage apparatus 1, described above and in the accompanying drawing, providing such alternative apparatus is capable of delivering the total doses specified above as desirable for accomplishing the purposes of the invention. For example, a linear accelerator of the type described by J. C. Slater in Reviews of Modern Physics, volume 20, No. 3, pages 473–518 (July, 1948), may be utilized. In general, the energy of the electrons employed in the practice of the invention may range from about 200,000 electron volts to 20,000,000 electron volts or higher.

What I claim as new and desire to secure by Letters Patent of the United States is:

1. The method which comprises irradiating with high energy ionizing radiation to a dose of from $1 \times 10^6$ to $1 \times 10^8$ rep. a mixture comprising (1) an organopolysiloxane having the general formula

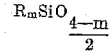

where R represents a member selected from the class consisting of alkyl, cycloalkyl, aryl, alkaryl, aralkyl, haloaryl, haloalkyl, cyanoalkyl radicals, and mixtures of such radicals, at least 50 mole percent of said members being lower alkyl groups having from 1 to 2 carbon atoms, and $m$ is a value of from 1.98 to 3, and (2) a minor proportion of an organic hydrogen transfer mercapto compound containing an —SH group and being free of olefinic unsaturation.

2. The method as in claim 1 wherein the mercapto compound is n-butyl mercaptan.

3. The method as in claim 1 wherein the mercapto compound is dodecylmercaptan.

4. The method as in claim 1 wherein the mercapto compound is 4-t-butyl thiophenol.

5. The method as in claim 1 wherein the mercapto compound is ethyl thioglycolate.

6. The method which comprises irradiating with high energy electrons to a dose of from $1 \times 10^6$ to $1 \times 10^8$ rep. a mixture comprising (1) a methylpolysiloxane having the formula

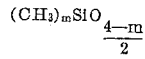

where $m$ is a value of from 1.98 to 3, and (2) a minor proportion of an organic hydrogen transfer mercapto compound containing a terminal —SH group and being free of olefinic unsaturation.

7. The method of claim 6 in which the mercapto compound is n-butyl mercaptan.

8. The method of claim 6 in which the mercaptan compound is 4-t-butyl thiophenol.

9. The method of claim 6 in which the mercapto compound is ethyl thioglycolate.

10. The method of claim 6 in which the mercapto compound is dodecylmercaptan.

11. The method of irradiating an organopolysiloxane having the general formula

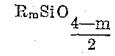

in which R represents a member selected from the class consisting of alkyl, cycloalkyl, aryl, alkaryl, aralkyl, haloaryl, haloalkyl, cyanoalkyl radicals and mixtures of said radicals, at least 50 mole percent of said members being lower alkyl groups having from 1 to 2 carbon atoms, and $m$ is a value equal to from 1.98 to 3, said method comprising irradiating in the presence of a minor proportion of an organic hydrogen transfer mercapto compound containing a terminal —SH group and being free of olefinic unsaturation, the aforesaid organopolysiloxane with high energy electrons having energies of from about 200,000 to 20,000,000 electron volts, the irradiation being carried out within a dose range of from about $1 \times 10^6$ rep. to $1 \times 10^8$ rep.

References Cited in the file of this patent

UNITED STATES PATENTS 2,904,481     Lawton et al. _____ Sept. 15, 1959
2,959,569     Warrick _____ Nov. 8, 1960